United States Patent

Haydu

[15] 3,655,070

[45] Apr. 11, 1972

[54] TRANSFER AND LIFT MECHANISM

[72] Inventor: Bartley A. Haydu, 22111 Marlow Street, Oak Park, Mich. 48237

[22] Filed: Apr. 7, 1969

[21] Appl. No.: 813,999

[52] U.S. Cl. ............................................. 214/1 BB, 198/218
[51] Int. Cl. .............................................................. B65g 25/04
[58] Field of Search ........................... 214/1 B, 1 BZ; 198/218

[56] References Cited

UNITED STATES PATENTS

| | | | |
|---|---|---|---|
| 2,168,527 | 8/1939 | Iversen | 214/16.14 B |
| 2,647,647 | 8/1953 | Alimanestiano | 214/16.14 B |
| 3,051,327 | 8/1962 | Goodell | 214/1 CM UX |
| 3,432,042 | 3/1969 | Bautz | 214/1 BZ |

*Primary Examiner*—Gerald M. Forlenza
*Assistant Examiner*—George F. Abraham
*Attorney*—Hauke, Gifford and Patalidis

[57] ABSTRACT

A transfer and lift mechanism for a press or similar machine which is wholly automatic and operates on a multiple cam principle comprising, primarily, a machine base on which is mounted a slide assembly provided with one or more cams or tracers mounted for movement along a predetermined path to move a work gripping and holding assembly in traverse, vertical and longitudinal direction. The cam or tracer unit is designed such as to enable it to move the work gripping and holding assembly within the above directions of movement either consecutively or simultaneously. By a proper design and combination of various cam tracer and lifting units, the work gripping and holding assembly advances in a traverse direction to grip the workpiece, then moves vertically after which it moves the workpiece along in a longitudinal direction, then lowers the workpiece into the next station to release the workpiece and then traverses out of the work area. The last move is in a direction to return the assembly to its initial position to complete one cycle.

36 Claims, 26 Drawing Figures

INVENTOR
BARTLEY A. HAYDU

ATTORNEYS

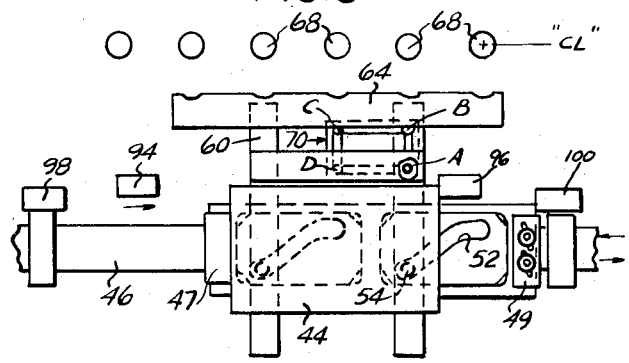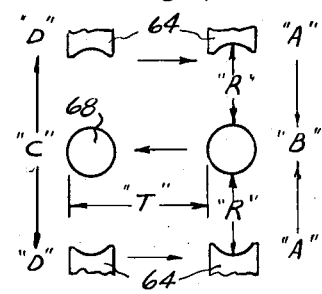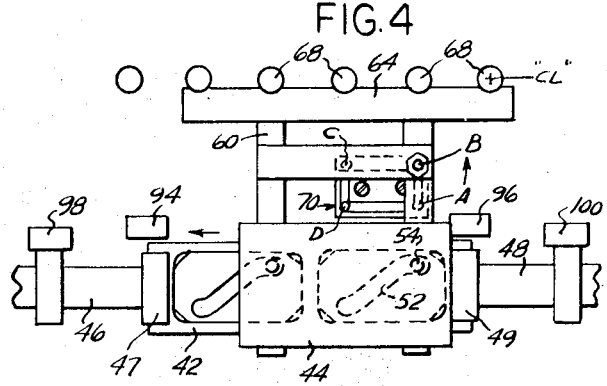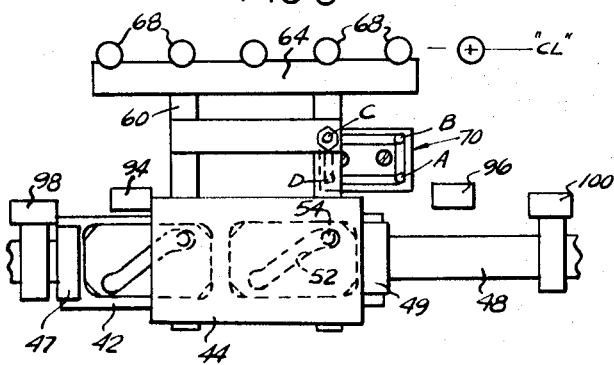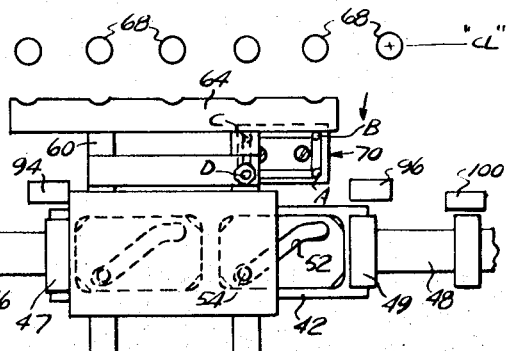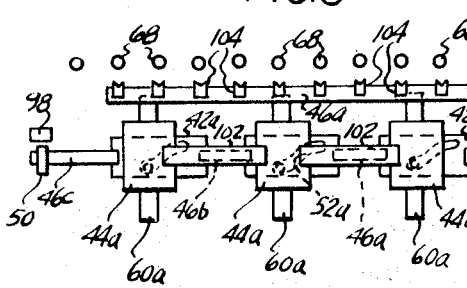

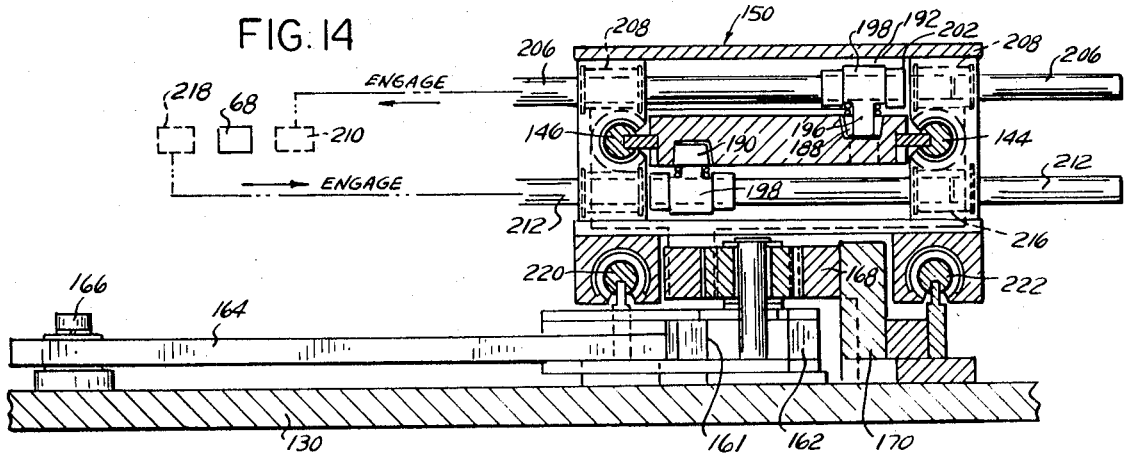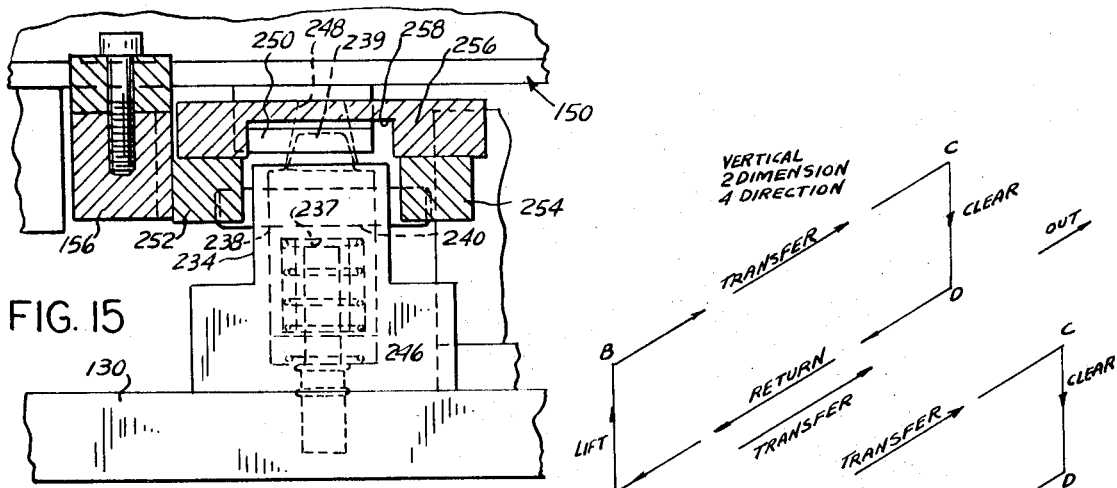

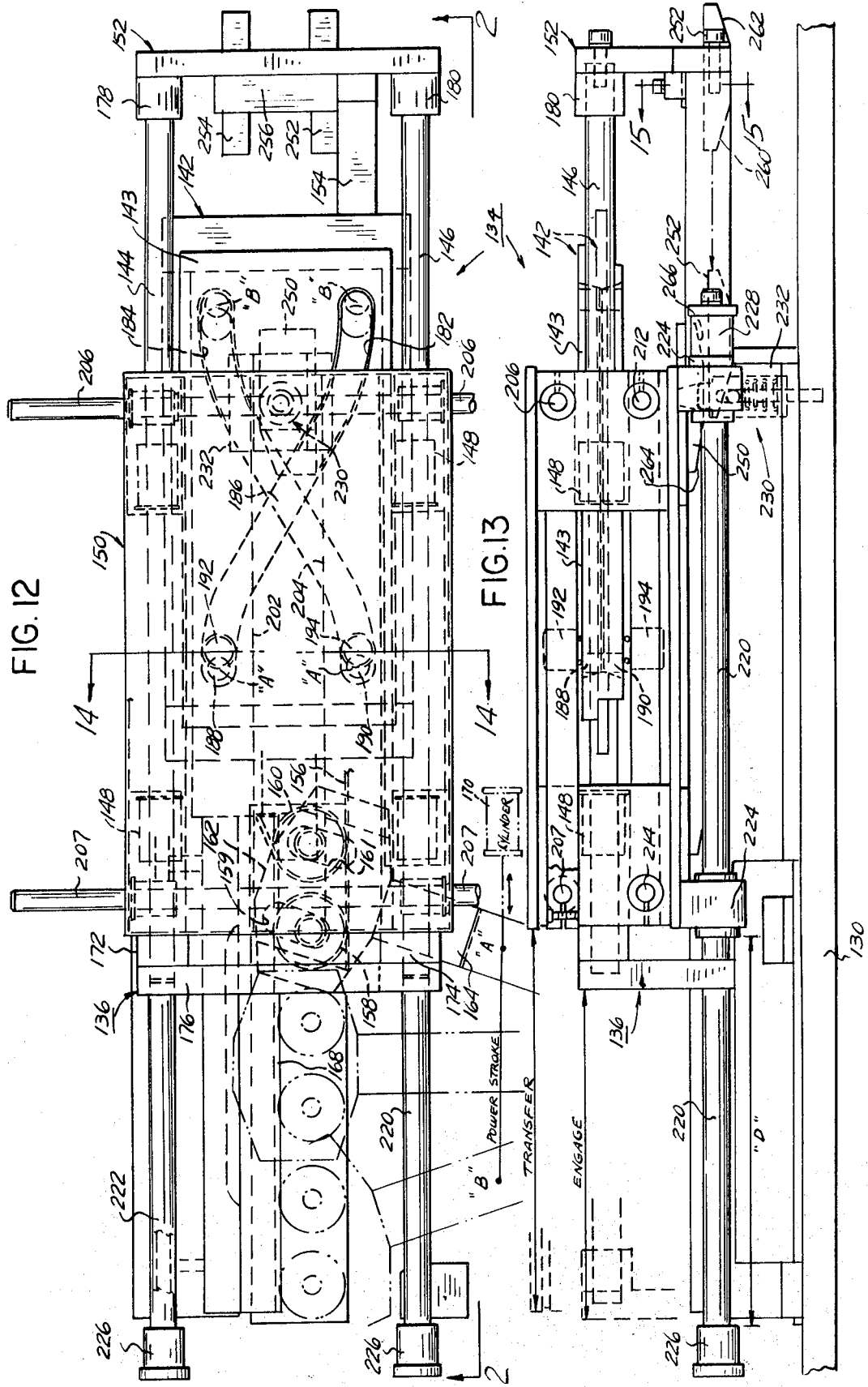

INVENTOR
BARTLEY A. HAYDU
BY Hauke, Krass, Gifford,
& Patalidis
ATTORNEYS

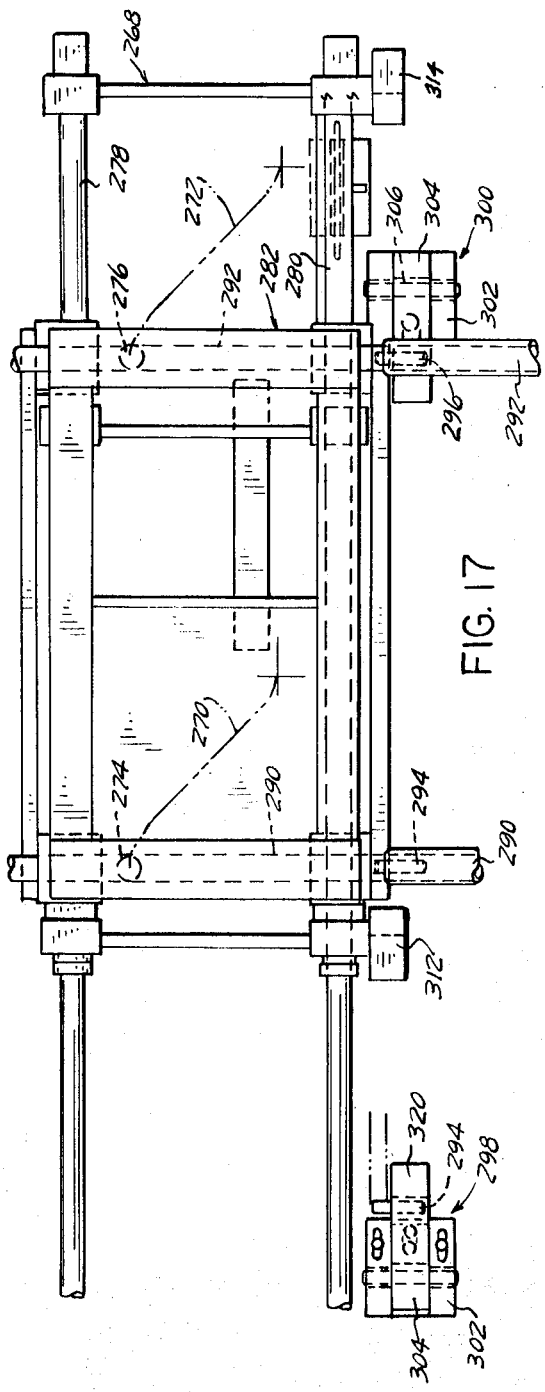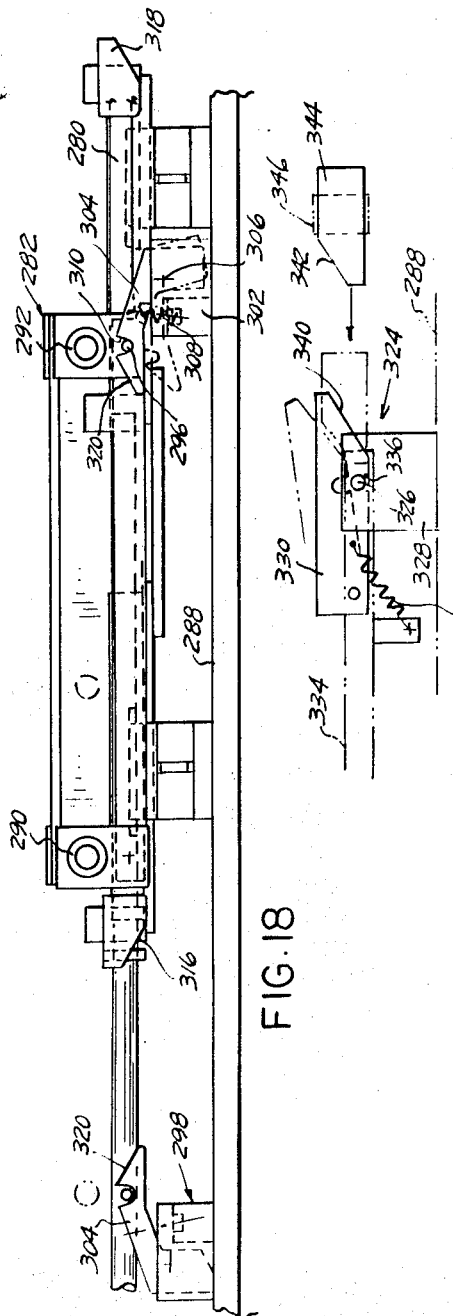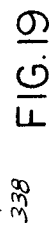

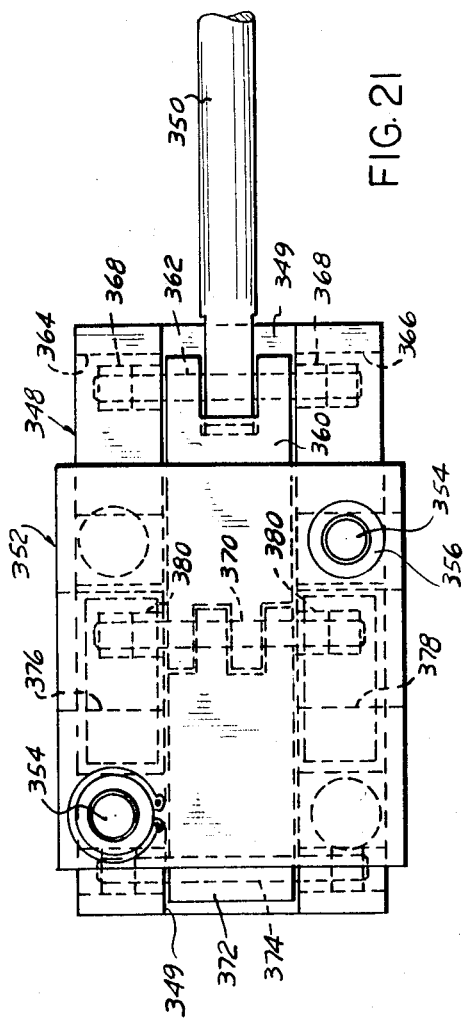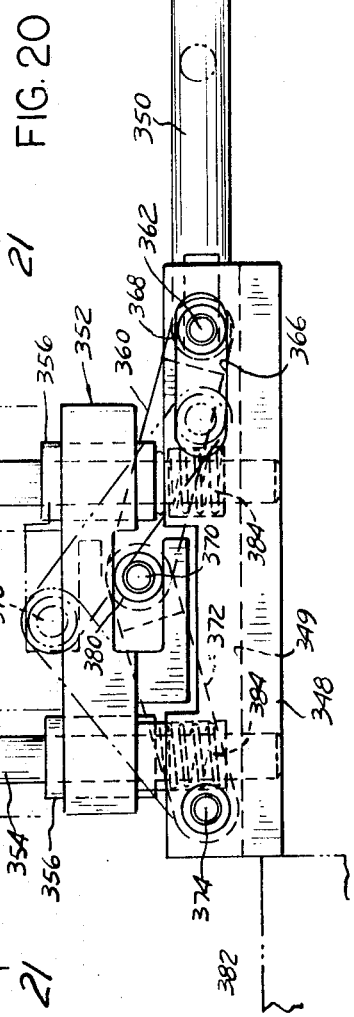

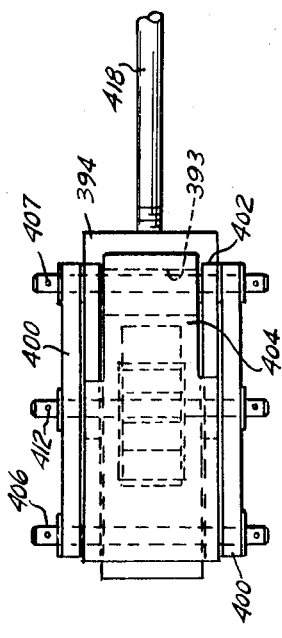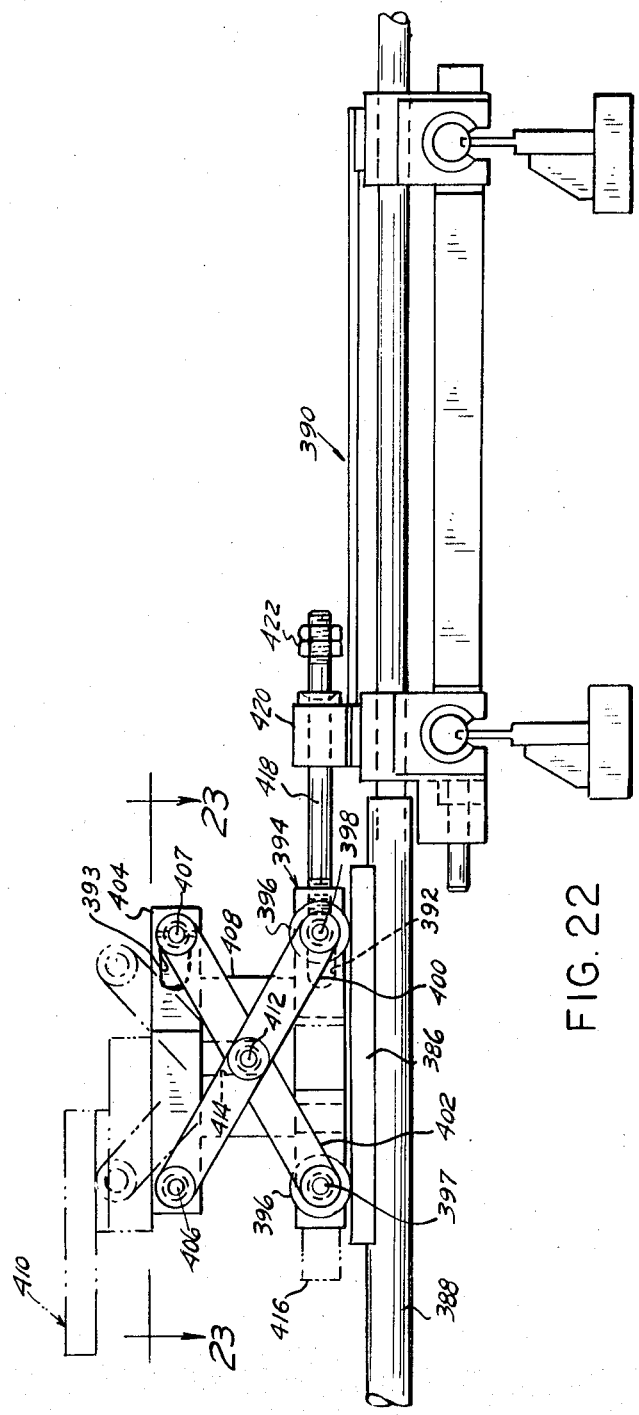

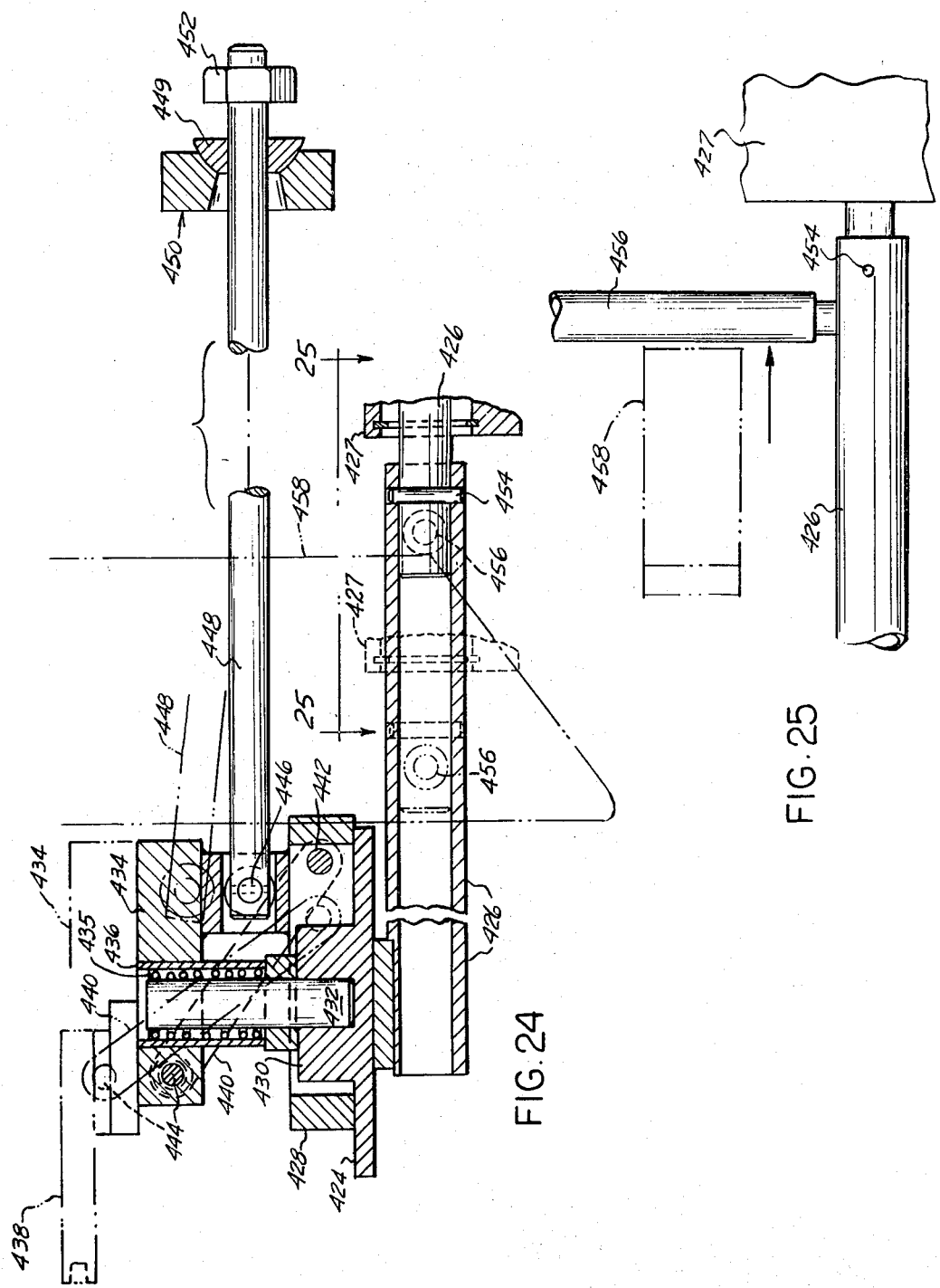

TRANSFER AND LIFT MECHANISM

BACKGROUND OF THE INVENTION

1. Field of the Invention

The present invention refers to transfer mechanisms for workpieces, and more particularly to a transfer device for use with presses or like machines which have a plurality of work stations so that the transfer mechanism is designed to move, to grip the workpiece or pieces and move the workpiece or pieces progressively from a pick-up station to a work station or stations.

In general, the transfer mechanism is provided with opposite work gripping and holding means which are adapted upon actuation of the transfer mechanism to advance towards each other at a pick-up station, to grip the workpiece or pieces and transfer same to a work station located remote from the pick-up station. The workpiece or pieces are then released from the gripping means by movement thereof away from each other. They are then caused to return to the pick-up station in reverse direction, but not necessarily along the same path, with the work gripping and holding means remaining in separated position during this reverse movement.

II. Brief Description of the Prior Art

Transfer mechanisms of the above kind are known in the art which usually employ a rack and gear motion transfer and driving mechanism for combined longitudinal and transverse movement. Other known transfer mechanisms employ rotatable cam tracks or crank-type lifting mechanism for the raising and lowering of the work gripping means.

These known transfer mechanisms are inherently inadequate in that they are very limited in their range of movement along different linear directions. The known gear and rack drive transfer mechanisms need the addition of positive stopping and locking means to prevent shock loads or bouncing of the carriage after establishing positive drive connection. This also requires occasionally the incorporation of means to positively lock the workpieces in the work holding means to prevent their accidental release.

In conventional mechanisms when geared transfers are used in stamping die presses, the drive rack, which is driven by the press ram, normally has a dwell in both up and down strokes, which means a required longer stroke. In addition, these drives have no harmonic motions other than that produced by the crank press. Longitudinal movement of workpieces has to be very accurate since they are only slid from station to station. Generally, this means that as a maximum only 15 strokes per minute can be obtained. Although higher speeds can be obtained by holding the gripping means in contact with the workpiece during the working operation, this limits this type of known machine to a very few particular parts.

Additionally, the known rack and gear mechanisms are generally complicated due to the employment of an excessive number of moving parts which are subject to extreme wear.

Other mechanisms are known which embody spring loaded work gripping means. These structures, aside from their complexities, are unreliable due to a decrease in spring force over a prolonged time and fatigue and general spring failures which precludes a reliable retainment and release of the workpiece.

Driving means for these known transfer mechanisms often embody a fly-wheel for storing energy for the return movement of the mechanism. This arrangement is likewise objectionable in that the large mass of the wheel puts an unnecessary load on the mechanism since the fly-wheel has to be stopped twice and reversed twice in each cycle of the mechanism, and also requires the inclusion of shock absorbing means to act during reversal of rotation to dampen undesirable bounce and shock loads.

It has been found that in known transfer mechanisms which employ cam tracks, the cam angles are generally too steep, therefore requiring an unnecessarily large power stroke and also considerably increasing the shock loads. In addition, the known cam operated transfer mechanisms are generally such as to require complicated actuating devices, such as limit switches and the like, to function accurately.

Although transfer devices are known which combine a lifting motion with a longitudinal and transverse motion, which in one known example is incorporated in a chain drive and gear and rack transfer mechanism wherein the lifting motion is effected by a gear driven crank mechanism, this mechanism is extremely complicated and of excessively large dimensions and thus is not universally adaptable to conventional die presses. These units also require two and more often three sources of power to function accurately which demands greater and more complex details in the correct timing of the power units.

The following U.S. Patents exemplify the known state of the art as described in the foregoing and hereby made of record:

| | | |
|---|---|---|
| 2,899,043 | J. R. Young | 8-11-59 |
| 2,929,485 | B. J. Wallis | 3-22-60 |
| 3,077,259 | C. K. Braun | 2-12-63 |
| 3,135,395 | B. J. Wallis | 6-2-64 |
| 3,165,192 | B. J. Wallis | 1-12-65 |
| 3,184,031 | G. H. Dunlap | 5-18-65 |
| 3,233,751 | T. W. Bannon | 2-8-66 |
| 3,247,980 | G. Michas | 4-26-66 |
| 3,295,701 | M. P. Alexander | 1-3-67 |

SUMMARY OF THE INVENTION

The present invention provides a novel, universal, motion transmitting drive mechanism for a transfer device actuated by tracer or guide cam means along prescribed linear paths to move the transfer mechanism through a plurality of positions.

More particularly, the invention provides a mechanism for effecting linear movement of a work gripping and holding tool in a single or a plurality of planes of movement obtained by guide cam means retained for movement in an oblique slot or track which may be curvilinearly, circularly or angularly shaped causing movement of the gripping and holding tool in a transverse direction, and a drive means for moving of the mechanism in a longitudinal direction. The drive means and the guide cam means are cooperatively interconnected for complementary movement to effect transfer of an article, workpiece or the like between spaced work stations.

In the present disclosure, the preferred transfer mechanism is herein described as being applied to a press or the like for gripping, indexing and releasing the workpiece progressively along a plurality of work stations.

Generally, the transfer mechanism comprises a base or support on which are mounted a pair of parallel opposed slides or carriages for reciprocatory simultaneous movement. Each slide supports a work gripping and holding tool which, in the preferred embodiment, is provided with a plurality of work gripping jaws or the like. The pair of work gripping and holding tools are arranged in opposed relation relative to each other and are adapted for movement towards and away from each other in a direction substantially normal to the linear reciprocatory motion of the pair of slides. The present mechanism is actuated by a single power source, such as the ram of the press, with an operable connection or actuator connected to both slides, or may be actuated by cylinders using air or hydraulic or by electro-mechanical means.

The pair of slides are each equipped with a cam guide or tracer retained for movement in an obliquely positioned track or tracks which may be curvilinearly, circular or angularly shaped and which has a direct actuating connection with the opposed work gripping and holding tools so that at a predetermined length of stroke of the slide the cam guides or tracers are forced to move within the track or tracks to thereby advance the gripping and holding tools towards each other to grip and retain a workpiece or pieces between them. The drive means, which acts directly on the slide, is constructed and arranged such as to retain the gripping and holding tools in closed position during transfer movement of the slide from station to station until at a predetermined position both the drive means and the guide cam means act to release the workpiece or pieces by opening the gripping and holding tools following which the slide is returned to its initial starting position.

In the simplest form of the preferred embodiment, the mechanism is operable in a single plane and four directions of movement. The opposed work gripping and holding tools advance to grip the work, the slide transfers the work to the next station, the gripping and holding tools recede to release the work and the slide returns to its starting position. An actual operation would then be as follows: the workpiece is fed into a pick-up or loading station where the advance gripping and holding tools engage the workpiece. This is accomplished by the guide cam means directly associated with the slide by forced movement of the guide cam means within an oblique guide track or tracks, thereby turning the movement of direction 90° from the longitudinal movement of the slide. Thereafter, directional movement of the gripping and holding tools is again turned 90° caused by the drive means resuming linear travel of the slide for transfer of the workpiece. At the end of the transfer stroke, the drive means and guide cam means again cooperate to change the direction of movement 90° thereby causing the gripping tools to recede from the workpiece. Following the release movement, the drive means cause another 90° change in direction of movement simultaneously with the initiation of the return movement of the slide to the start position.

In more sophisticated machine arrangements, the guide cam means and drive means, as shown and described herein, are designed for operation in multiple directions, such as four horizontal directions, two vertical directions, two traverse directions, etc. This is particularly necessary in dies or machines which require an additional sequential work lifting and/or lowering movement together with the linear and transverse movement to raise or lower the workpiece above the plane of the part locators and work area.

In the mechanisms which require lifting movement, the lifting can be accomplished by a toggle lever or scissor type lever mechanism in conjunction with a guide cam means, as will be explained and described in the present disclosure.

Thus, in general, the present invention provides a two or three dimensional transfer mechanism which eliminates the disadvantages of the prior art, particularly their bulky and complex mechanisms and the jerks and shock loads associated therewith, by the provision of a smooth operating mechanism which assures that workpieces will be released onto the die, gage, or the like in accurate position.

Additional novel features and advantages of the present invention will particularly be pointed out in the following detailed description by reference to the accompanying drawings.

BRIEF DESCRIPTION OF THE DRAWINGS

In the drawings:

FIG. 3 is a schematic illustration of the lower slide mechanism of the transfer device in FIG. 1 shown in the start position;

FIG. 4 shows the lower slide mechanism in the work engaged position;

FIG. 5 shows the lower slide mechanism in the work transfer position;

FIG. 6 shows the lower slide mechanism in the work released position, ready for the return stroke;

FIG. 7 is a diagrammatic illustration of the movement of the transfer device shown in FIGS. 1 to 6;

FIG. 8 is a schematic illustration of a further embodiment of a simplified transfer device according to the present invention;

FIG. 9 is a diagram of a horizontal two dimensional transfer movement in four directions according to the present invention;

FIG. 10 is a diagram of a vertical two dimensional transfer movement in four directions according to the present invention;

FIG. 11 is a diagram of a vertical and horizontal three dimensional transfer movement in six directions according to the present invention;

FIG. 12 is a plan view of a single slide mechanism for a transfer device according to the present invention which performs the same function as the dual slide mechanism shown in FIG. 1;

FIG. 13 is a side view of the slide mechanism shown in FIG. 12;

FIG. 14 is a cross section through the slide mechanism shown in FIG. 12 along line 14—14 thereof;

FIG. 15 is an enlarged cross section through the cam lock release mechanism of the slide mechanism shown in FIGS. 12 and 13 along line 15—15 of FIG. 13;

FIG. 17 is a plan view of a modified slide arrangement for a transfer device according to the present invention;

FIG. 18 is a side view of the slide mechanism shown in FIG. 17;

FIG. 19 shows a modification of the lock mechanism embodied in the slide mechanism shown in FIG. 18;

FIG. 20 is a side view of a lift mechanism which may be utilized in either slide arrangement of FIGS. 12 or 17;

FIG. 21 is a top view of the lift mechanism shown in FIG. 20;

FIG. 22 illustrates a further embodiment of a lift mechanism for use in either slide mechanism of FIG. 12 or 17;

FIG. 23 is a top view of the lift mechanism shown in FIG. 22;

FIG. 24 illustrates still another embodiment of a lift mechanism employing a safety feature in the form of a shear pin; and FIG. 25 is a partial top view of a portion of the mechanism shown in FIG. 24.

BRIEF DESCRIPTION OF THE PREFERRED EMBODIMENTS

Figure 1:
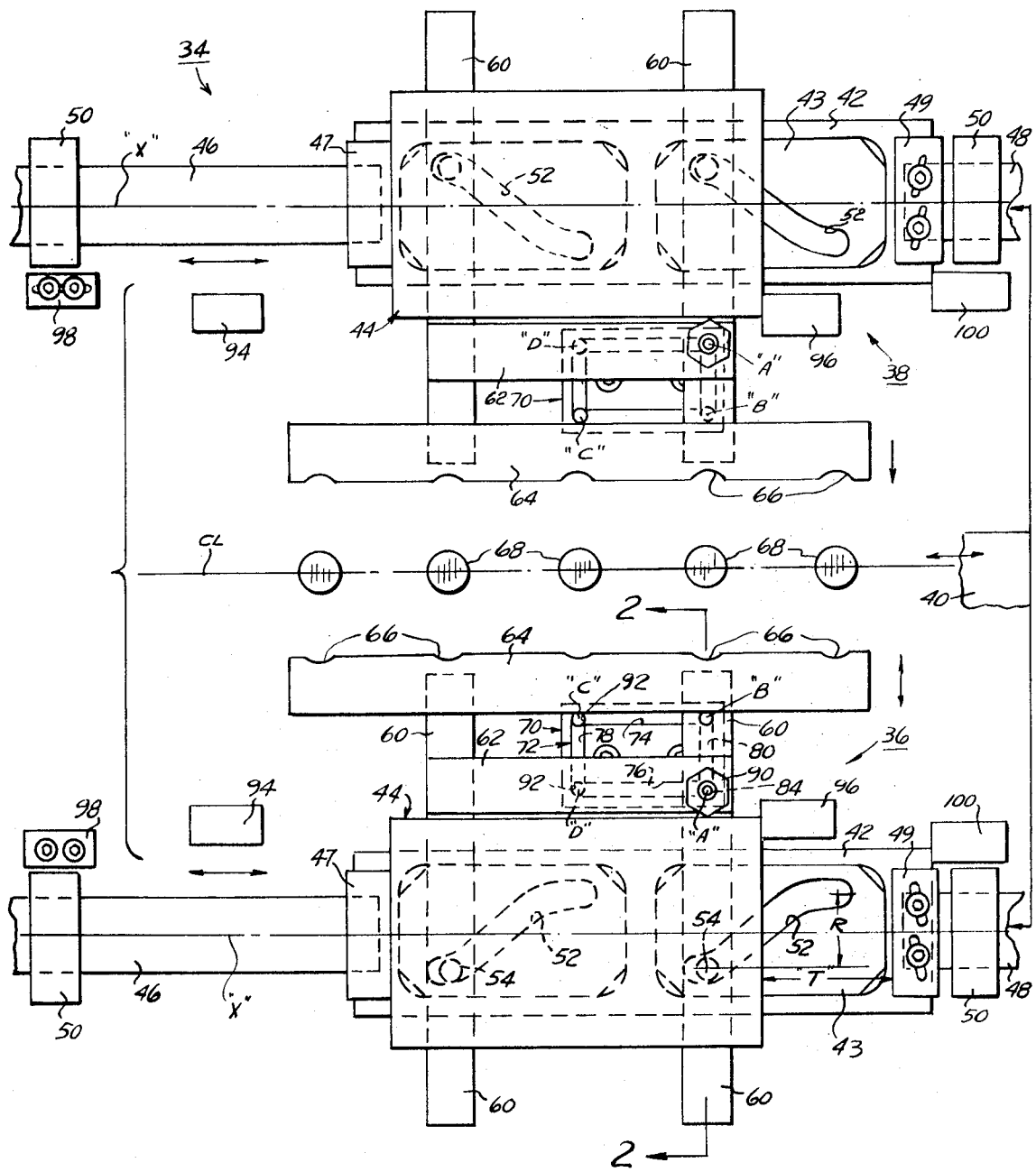
FIG. 1 is a plan view of a schematic illustration of the present novel transfer device embodying oppositely positioned slide mechanisms.
Figure 2:
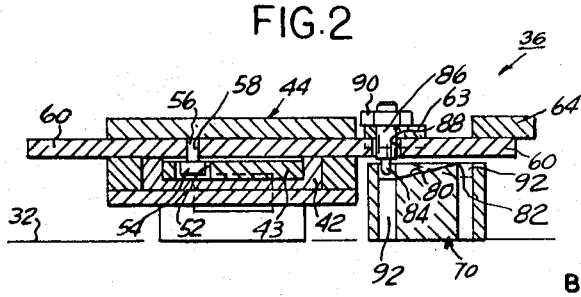
FIG. 2 is a cross section through the lower slide mechanism of the transfer device in FIG. 1 along line 2—2 thereof.
Figure 16:
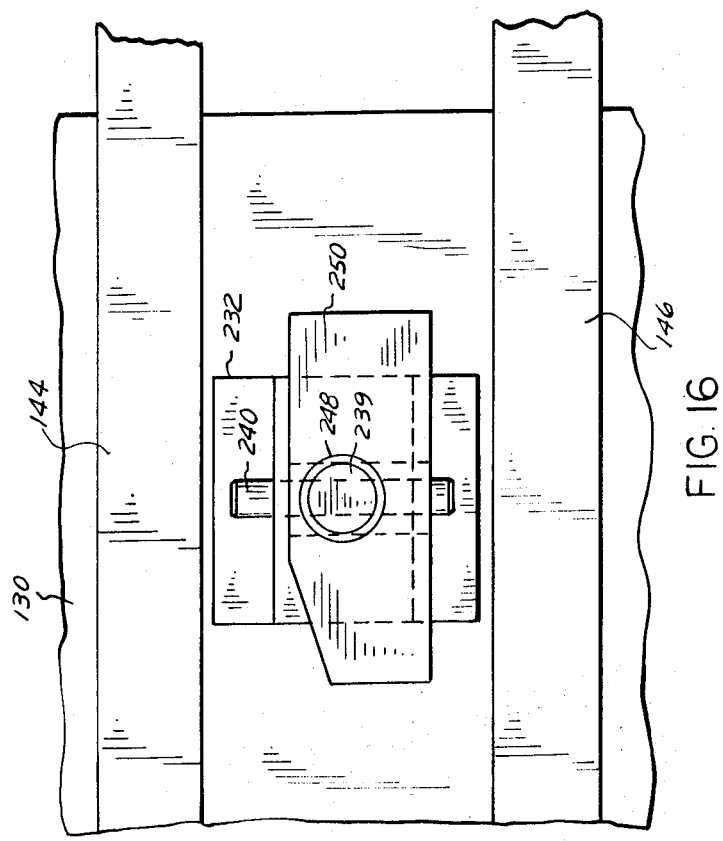
FIG. 16 is an enlarged fragmentary plan view of the lock mechanism embodied in the slide mechanism shown in FIG. 12.

With reference to the drawings and in particular to the schematic illustrations in FIGS. 1 to 11, the present transfer mechanism is schematically shown in connection with a press or the like for the purpose of description only and which, as shown in FIGS. 1 and 2, is provided with a base on which is mounted a machine bed 32. The transfer mechanism 34 is supported on the machine bed 32 and includes two slide assemblies 36 and 38 which are arranged in parallel on the machine bed 32 in opposite position relative to each other. The slide assemblies 36 and 38 are connected to a ram 40 or the like for reciprocation and may be actuated by any well known single power source.

The two slide assemblies 36–38 are preferably identical except for being left and right handed and the description for one will similarly apply to the other, like parts being identified by the same reference numerals. Thus, the slide assembly 36 is comprised of a longitudinal plate 42 positioned within a flat housing 44, as seen in FIG. 2, for longitudinal movement therein. The opposite ends of the plate 42 are attached by means of adjustable bumper stops 47 and 49 to the ends of respective oppositely axially aligned tie bars 46–48 which are supported for sliding movement within bearings 50 and which are preferably of the anti-friction ball bushing type. The other end of the tie bar 48 is operably connected to the slide ram 40 for reciprocating movement thereby.

The slide plate 42 is provided with at least one, but preferably two, identical spaced guide tracks or cam slots 52 which are obliquely positioned relative to the longitudinal axis "X" of the tie bars and slide plate 42. As illustrated, the racks 52 are disposed in cam plates 43, although they may be provided directly in the slide plate 42. Each of the guide tracks 52 receives a cam follower or tracer roller 54 for movement within the tracks 52. With particular reference to FIG. 2, the tracer roller 54 is provided with a pin or pivot shaft extension 56 adapted to fit into an aperture 58 provided in an extension bar 60, which is reciprocably disposed within the flat housing 44 on top of and transversely across the slide plate 42, as seen in FIG. 2. In the present embodiment, two extension bars 60 are provided in parallel aligned relationship, one for each guide track 52, as seen in FIG. 1, and which are connected outside the housing towards the center line "CL" of the transfer mechanism by a cross bar 62. Secured to the ends of the extension bars 60 by any conventional fastening means is a gripping tool 64, which is provided with a series of depressions or jaws 66 adapted to engage the workpiece, indicated at 68, when brought in contact therewith.

Secured to the machine bed 32 adjacent the inner end of the housing 44 and underneath the extension bars 60 is a cam assembly 70, which on the surface is provided with a linear rectangular guide track 72. The guide track 72 has two parallel opposed longitudinal portions 74 and 76 connected at their ends by a pair of parallel opposed transverse portions 78 and 80. It can be seen that the transverse portions 78–80 are shorter than the longitudinal portions 74–76 for a purpose which will be described hereafter. As will be noted in FIG. 2, each of the guide track portions 74 to 80 are slightly inclined along their length in alternate opposite directions forming shoulders 82 at the high point of the tracks, which are disposed in counter-clockwise directions around the rectangular track 72 for a purpose to be described. Still referring to FIG. 2, a guide pin 84 extends into the track 72, which is resiliently supported in the manner of a conventional detent arrangement within a screw shank 86, which extends through an aperture 88 of the extension bar 60 and which is threaded through the overlying end 63 of the cross bar 62 for outward extension and securement to the cross bar by a nut 90. At the junctions of the transverse track portions 78–80 with the longitudinal track portions 74–76, holes 92 are provided for extension and temporary retainment of the guide pin 84 therein, as will be explained in the following: Upon movement of the slide assembly 36, the resiliently suspended guide pin 84 rides up along the inclined surfaces of the track portions 74 to 80 in counter-clockwise direction around the track. At every point of intersection, which are designated "A" "B" "C" "D" for sake of explanation, as the guide pin 84 finishes traversing any individual track portion 74 to 80, the guide pin 84 drops into the respective hole 92 for temporary retainment therein as the slide performs a secondary movement, as will be described later on. The guide pin 84 at all temporary retainment points at the corners of the track 72 is effectively prevented from backward movement along the track portion just traversed by means of its abutment against the shoulder 82 and thus temporarily maintains the position just obtained during the consecutive secondary slide movement.

With still further reference to FIG. 1, oppositely disposed adjustable front and rear stop members 94 and 96 are adjustably secured to the machine bed 32 in a position so as to be in the path of the reciprocating slide housing 44, as seen in FIG. 1, in which the slide housing is shown abutting against the rear stop member 96. Another pair of adjustable front and rear stop members 98 and 100, respectively, are adjustably secured to the machine bed 32 at a predetermined distance outwardly from each of the first mentioned stop members to provide a forward and rear stop for the reciprocating slide plate 42, as illustrated in FIG. 1, in which the slide plate is shown abutting against the rear stop member 100. Preferably, all of the stop members 47, 49, 94, 96, 98 and 100 are shock absorbing units of a construction well known in the art to dampen the initial engagement of the slide with the stops prior to coming to a complete stop. Prior to the operation of the machine, each pair of stop members 94–96 and 98–100 is adjusted at a predetermined distance relative to each other so as to obtain the required limit stops for the forward and return movement of the slide plate 42 and slide housing 44 for a purpose as will be explained in the following.

With particular reference to FIGS. 3 to 7, the operation of the transfer mechanism shown in FIG. 1 is schematically illustrated in regard to the slide assembly 36, it being understood that the operation and function of the opposite slide assembly 38 is identical in all respects thereto.

The start position of the slide assembly 36 is shown in FIG. 3. In this position, the slide plate 42 is stopped against the rear stop member 100 and the slide housing 44 is stopped forwardly against the tie bar bumper stop 47 and rearwardly against the rear stop member 96. The tracer roller 54 is positioned in the lower part of the guide track 52 and the guide pin 84 of the cam assembly 70 is positioned in a hole 92, designated point "A", which, in the drawings, is the right hand lower corner of the rectangular track 72.

After starting of the machine, the workpiece or pieces 68 are fed into the pick-up station by hand or automatically. The slide assembly is then actuated by the ram 40 to thereby move the slide plate 42 through the slide housing 44 away from the stop member 100 (e.g., towards the left in the drawings). The linear movement of the slide plate 42 causes the tracer rollers 54 to move upwardly within the slots or guide tracks 52. Since the tracer rollers 54 are connected by pins 56 to the extension bars 60, the extension bars are caused to move through the housing 44 in a direction normal to the direction of movement of the slide plate 42. By movement of the extension bars 60 out of the housing 44, the gripping tool 64 is advanced towards the center line "CL" of the slide assembly and the guide pin 84 in the cam assembly 70 is moved up on the inclined short side track portion 80 towards the opposite point "B" where the guide pin drops again into a hole 92 to be temporarily locked therein to prevent inadvertent back movement by its abutment against the shoulder 82. At the same time, the tracer rollers 54 have advanced upwardly in the guide tracks 52 to their uppermost position in the tracks and the gripping tool 64 has engaged the workpieces 68 by means of its jaws 66. This position of the slide assembly is illustrated in FIG. 4.

It should be particularly noted at this point, that the slide housing 44 did not move although the front bumper stop 47 moved away from the housing, as seen in FIG. 4, since it is attached to the slide plate 42. The slide housing 44 is held in place during the initial combined linear and transverse movement of the slide assembly by movement of the guide pin 84 within the transverse track portion 80, which prevents movement of the housing 44 since the guide pin 84 is attached to the extension bar 60, which in turn is retained in the housing 44. This particular coaction between the parts is important to obtain alternating successive combined and single motion and alternating changes in direction as will be more clearly understood as the description of the operation of the device proceeds.

In the work engaged position of the slide assembly 36, illustrated in FIG. 4, the slide plate 42 has moved through the housing 44 (towards the left in the drawings) a distance "T" (FIG. 1) defined by the distance between the edge of the housing 44 and the rear bumper stop 49, which now abuts against the rear of the housing as shown. As the slide plate 42 continues its movement on actuation by the tie bar 48, the direction of movement of the gripping tool 64 will be changed 90 degrees from transverse to linear, that is, towards the left in the drawings, and parallel to the slide movement. This motion is accomplished by means of the rear bumper stop 49 abutting against the rear edge of the slide housing 44 causing the complete slide assembly to be moved towards the left. Since the extension bars 60 are retained in the housing 44, the gripping tool 64 retaining the workpieces 68 will likewise be moved towards the left to transfer the workpieces to a work station. Movement towards the left causes the guide pin 84 of the guide cam assembly to move along the inclined track of the longer track side 74 of the rectangular guide track 72 from point "B" to point "C" at the end of which the guide pin will again drop into a hole 92 and temporarily retain the gripping tool in the work station position. The tracer rollers 54 in the slide guide tracks 52 during this movement remain in their uppermost position in the tracks.

The work station position of the slide assembly is illustrated in FIG. 5, in which the guide pin 84 has moved to point "C" of the rectangular guide track 72. The slide plate 42 comes to a stop against the front stop member 98 and the slide housing 44 comes to a stop against its front stop member 94. At this point, the direction of movement of the ram 40 is being reversed, which can be accomplished by appropriate conventional cycling means, which do not need to be described. Reversal of the ram movement causes the tie bars 46–48 to reverse their movement likewise, that is, move from the left to the right in the drawings. The slide plate 42, due to its connection to the tie bars 46–48, is moved back through the slide housing 44 towards the right in the drawings. This movement causes the tracer rollers 54 to move in opposite directions, that is, down in the guide tracks 52 thereby pulling the extension bars 60 back into the housing 44. The extension bars 60, due to their connection to the gripping tool 64, pull the gripping tool away from the workpieces and move into open position. Simultaneously, the guide pin 84 of the cam assembly 70 reverses its direction of movement 90° to be moved along the inclined track of the opposite short side portion 78 of the rectangular track 72 from point "C" towards point "D".

During this movement, as previously described, the guide pin 84, due to its connection to the extension bar 60, prevents the slide housing 44 from movement. When the guide pin 84 has reached point "B" on the rectangular track 72, it drops into a hole 92 to temporarily retain the gripping tool. At the same time, the tracer rollers 54 will have reached again the lowermost position in the guide tracks 52 as the slide plate 42 moves through the retained housing 44, at which point the front bumper stop 47 will have engaged the front edge of the housing 44, as shown in FIG. 6.

FIG. 6 illustrates the initial return position of the front bumper stop 47 against the slide housing 44, which is thereby forced to move together with the slide plate 42 in the direction towards the right in the drawings. The return movement of the complete slide assembly as a unit causes the guide pin 84 of the cam assembly 70 to again change its direction of movement ninety degrees and to move back from point "D" to point "A" along the opposite inclined longer side track portion 76 to resume its starting position at point "A" in FIG. 3. At the same time, the slide plate 42 comes to a stop against its rear abutment member 100 and the slide housing comes to a stop against its respective rear abutment member 96 so that the complete assembly will be back in its initial position, as shown in FIG. 3, for a repeat of the cycle described in the foregoing.

It will be understood that the rise and contour of the curvilinear guide track 52 is designed so as to have a very shallow angle and large radii at the points where the gripping jaws engage and disengage to considerably reduce shocks transferred to the workpieces and are also designed in direct relation to the required distance of advance of the gripping tool and the distance of transfer travel which, in turn, is determined by the length of the track portions 74 to 80 of the rectangular guide track 72. Obviously, these dimensions and contours of the guide tracks 52 and 72 can be varied, one in relation to the other, to accommodate various requirements of tool and transfer travel, as shown by example in the accompanying drawings, and which will be described further on. An exemplary travel requirement is shown schematically in FIG. 7 in which the required movement of the gripping tool is shown to be 1 ⅛ of an inch and the required transfer travel 2 inches. Thus, the rectangular guide track 72 will have to have 2 inch track portions 74–76 between points "B"–"C" and points "D"–"A" and transverse track portions 78–80 between points "A"–"B" and "C"–"D" measuring 1 ⅛ of an inch. The oblique or curvilinear slide track 52 then will have to be designed such as to provide a rise "R" of 1 ⅛ of an inch and a linear travel distance "T" or 2 inches. Minimal track variations can be compensated for by appropriate adjustment of the bumper stops 47 and 49.

With reference to FIG. 8, by the unique provision of individual tie bars, such as 46–48, a plurality of individual slide assemblies can be tied together if a greater span is required. As for example shown in FIG. 8, three identical slide assemblies 36a–b–c are tied together with tie bars 46a–b–c to be moved as a unit. In this instance, it is not necessary to provide two oblique tracks 52 for each slide plate 42a since by means of a greater of units tied together one oblique track 52a for each unit will be sufficient. In the multiple slide assembly as shown in FIG. 8, it is desirable and preferable to also tie the individual slide housings 44a together by tie means, such as shown at 102, so that only two adjustable stops are needed at each end. As likewise shown in FIG. 8, for greater firmness of gripping the workpiece 68, preferably individual gripping fingers 104 will be provided on the gripping tool 64a in place of the depressions or jaws 66.

FIGS. 1 to 7 schematically illustrate a transfer mechanism operable in four directions in a horizontal, two-dimensional plane, as indicated in the diagram in FIG. 9, the respective reference points of movement being indicated by letters A–B–C–D. As explained before, the gripping tools advance between points "A" and "B". At "B" the work is engaged. Transfer of the work still in the same plane is from point "B" to "C". At "C" the work is disengaged and the gripping tools clear the work area between points "C" and "D" and the slide returns from "D" to "A" still in the same plane.

Obviously, as indicated by the diagram in FIG. 10, the device is operable in a vertical plane as well and thereby providing a lifting motion of the work.

Point "A" indicates the start. The advance of the work gripping tools, which in this instance is a lifting motion, is from "A" to "B" at which the work is engaged and transfered from "B" to "C". At "C" the work is disengaged and the work gripping tools clear the station or work area by traveling into the lower position from "C" to "D". "D" is the turning point from which the mechanism returns to the starting point "A".

FIG. 11 diagrammatically illustrates a six direction, vertical and horizontal, three-dimensional transfer movement which is a particular feature of the present invention, as will be further described in detail with reference to FIGS. 20 to 25 showing several embodiments of this feature. In the diagram, the start of the transfer is a transverse movement from "A" to "B". The lift movement of the gripping tools is from "B" to point "C". The lift movement may be angular or straight vertical, as indicated. Transfer movement of the work is from "C" to "D", where the work is lowered onto or into gages, points "D" to "E". The gripping tools clear the work area by moving from "D" to "F", and return movement of the transfer is then from point "F" to point "A". Obviously, this three-dimensional movement can be varied, for instance, a first workpiece is already gripped at point "B" and the cycle is started by imparting a lifting movement to point "C", then it is transferred to a point above the work station, point "D", the direction changes here and the workpiece is lowered to point "E" where it is located by gages. From here the gripping tools traverse to "F" for return movement of the slide from "F" to "A". Conversely, the mechanism can be utilized to remove a workpiece from a work station, impart a lifting or lowering motion and transfer it to an unloading station.

Several modifications of preferred transfer mechanisms are illustrated in FIGS. 12 to 25 and will now be described in detail.

With reference to FIGS. 12–16, there is illustrated a practical embodiment of a transfer device constructed in accordance with the present invention. This is a one-slide mechanism, having a dual cam track and gripping tool assembly, which eliminates the need for another identical slide as in the schematic illustration in FIG. 1 for positioning of the mechanism to one side of the press or other machine.

The transfer mechanism 134 of FIGS. 12-16 comprises a slide assembly 136 positioned on a machine base or the like 130. The slide assembly 136 is composed of a cam plate slide member 142 providing a cam plate 143, which is laterally secured on both sides to parallel slidable rods 144 and 146, which are slidably retained within spaced bearing members 148, secured within a housing member 150 in which the cam plate 143 is slidably supported. The ends of the sliding rods rearwardly of the housing member 148 are secured to a support member 152, which extends downwardly therefrom and is secured to the extended end of a rack member 154, which extends parallel to the sliding rods 144-146 underneath the housing member 150 and towards the front of the slide mechanism where the toothed portion 156 of the rack member is in engagement with a pair of gears 158-160, which are freely slidably retained within slots 159-161 in the head portion 162 of a pendulum type actuator lever 164, while the opposite end of the actuator lever 164 is pivotally retained on a fixed pivot member 166 secured to the base 130 of the slide assembly, as seen in FIG. 14. The pair of gears 158-160 are oppositely in engagement with a stationary rack member 168 extending in parallel relationship to the movable rack member forwardly of the housing member 150, which is secured to a frame member 170 attached to the base 130 of the slide assembly, as seen in FIG. 14. When the actuator lever 164 is being swung around its pivot 166 by a power device, such as a cylinder 170, or any other means, from a position "A" to "B", the movable rack member 154 is moved forwardly and thereby moving the cam plate slide 142 forwardly through the housing member 150, since the cam plate slide is attached to the movable rack 154 by the support member 152, as described before. Because of the angular movement of the actuator lever 164, the slots 159 and 161 provided in the head portion 162 allows the gears 158-160 to adjust themselves accordingly during swinging movement of the actuator lever.

Figure 13A:
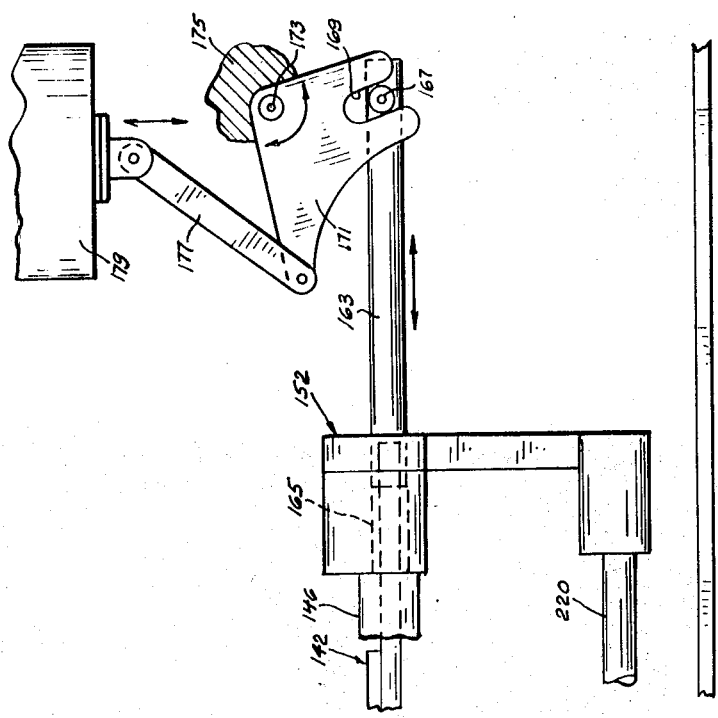
FIG. 13a illustrates an alternate drive arrangement for the slide mechanism shown in FIGS. 12 and 13.

An alternate slide actuation is illustrated in FIG. 13a which comprises a push and pull rod 163 suitably secured to the slide 142 and contained at that end for reciprocation within a bushing 165 in the support member 152. The other end of the rod 163 is provided with a cam follower roller 167 which is adapted to be engaged within a slot 169 provided in one end of a bell crank lever 171 which is pivoted at 173 to a stationary portion 175 of the press or the like. The other end of the bell crank lever 171 is pivotally connected to an arm 177, whose other end is pivotally connected to a portion of the reciprocating ram 179 of the press. Thus, as will be clear from the drawing, the slide 142 will be moved back and forth in synchronism with the reciprocating movement of the ram which transmits its forces through the arm 177 and bell crank lever 171 to the push or pull rod 163.

The front end of the sliding rods 144-146 extending forwardly out of the housing member 150 are each provided with a bumper 172 and 174 and are secured together by a plate member 176. The front bumpers 172-174 normally abut against the front face of the housing member 150, as shown in FIG. 2. The rear ends of the sliding rods are each similarly provided with a bumper 178 and 180, respectively, adjacent to the support member 152 and, in the normal or start position of the transfer device, are removed from the housing member 150, as shown.

The cam plate 143 is provided with an upper oblique cam slot or track 182 and a lower oblique cam slot or track 184 positioned diagonal to each other to cross at a point 186 at the center of the slide mechanism. The tracks 182-184 are adapted to receive each a cam follower roller 188 and 190, respectively, which, as seen in FIG. 14, are each rotatably supported on an actuator pin 192 and 194, which each have a cranked pin portion 196 and a head portion 198, which arrangement is such that by means of the cranked pin portion the axis of the head portion 198 of the actuator pins and the axis of the cam follower rollers are offset from each other, as seen in FIGS. 12 and 13, for a purpose to appear.

As particularly seen in FIG. 14, the cam actuator pins 192-194 are each provided with a seal and bearing assembly 200 between the head portion 198 and the respective cam follower rollers 188-190.

The head portion of the upper cam actuator pin 192 is supported in longitudinal actuator member 202 contained for lateral movement within the housing member 150 and the head portion 198 of the lower cam actuator pin 194 is similarly supported in another longitudinal actuator member 204 likewise contained for lateral movement within the housing member 150. Initially, that is, in the starting position of the transfer device, the longitudinal actuator members 202-204 are positioned towards the outside of the housing member 150, as shown. The upper actuator member 202 is attached to a pair of parallel extension rods 206-207 which are slidably supported in the housing member 150 within bearings 208. As indicated in FIG. 14, the outer ends of the upper extension rods 206-207 are attached to a work gripping tool 210. Similarly, the lower actuator member 204 is attached to a pair of parallel extension rods 212-214 which are likewise slidably supported in the housing member 150 within bearings 216. As indicated in FIG. 14, the outer ends of the lower extension rods are attached to a similar work gripping tool 218 disposed opposite from the work gripping tool 210 and in the same plane therewith. As will be understood from the prior description, the work gripping tools 210-218 are adapted upon operation of the transfer device to advance towards each other, to grip and retain a workpiece 68 in between them.

As hereinbefore mentioned, the cam plate slide 142 is slidable within and relative to the housing member 150. The housing member 150 is also slidably supported on the base 130, and the cam plate slide is only movable within the housing member when the latter is locked against movement. This occurs twice in each power cycle: at the beginning of the forward stroke when the slide assembly is moved into active position and at the start of the return stroke of the slide assembly, as will be explained more in detail in the following.

The housing member is slidably supported on a pair of opposite slide bars 220-222 by means of spaced bearing members 224. The slide bars 220-222 are stationary supported on the base 130 and each is provided at its ends with identical front bumpers 226 and rear bumpers 228. Thus, the housing member 150 is movable between the front bumpers 226 and the rear bumpers 228, which in each limit position will be abutted by a respective bearing member 224.

In order to lock the housing member 150 against movement at a certain stage in the operating cycle, a pair of longitudinally spaced lock assemblies 230 has been provided centrally of the slide mechanism, although only one assembly is shown in the drawings to maintain clarity. The rear lock assembly shown in the drawings in FIGS. 12, 13 and 15 is composed of a support 232 secured to the base 230 and provided with a central boss portion 234 which has a blind bore 236 in which is slidably retained a lock pin 238. The lock pin 238 is provided with a trunnion 240, which is secured therein so that the ends of the trunnion extend from the pin and through the walls of the boss portion 234 by means of opposite slots 242-244 provided therein. Normally, the lock pin 238 is biased outwardly of the blind bore 236 by means of a spring 246 disposed in a recess 237 of the lock pin and supported in the bottom of the blind bore. The spring forces the lock pin outwardly until restricted by the outer ends of the trunnion 240 abutting against the upper end of the slots 242-244 as shown in FIG. 13. In this position, the tip 239 of the lock pin 238 extends into a hole 248 provided in a lock plate 250, which is attached to the under-side of the housing member 150, thereby locking the housing member against movement. To release the lock, the rear support member 152 of the cam plate slide 142 is provided at its lower end with a pair of spaced cam shoes 252-254 which are attached to the under-side of an intermediate cross member 256, secured to the support 152. The cross member 256 is provided at its under-side with a cut-out 258 to clear the release lock pin 238 upon movement of the slide mechanism, as will become apparent. The cam shoes 252-254 are spaced a distance such as to pass along both sides of the boss portion 234 of the stationary lock support 232 upon movement of the slide mechanism, and are positioned such as to abut against the outer ends of the lock pin trunnion 240. The under-side of each of the cam shoes is tapered in opposite direction to provide a forward release cam surface 260 and a return release cam surface 262. Thus, as the cam slide mechanism is moved longitudinally from the start position, as shown in FIG. 13, to the position indicated in dot and dash lines, the forward cam surface 260 of the cam shoes 252-254 act on the lock pin trunnion 240 to press the lock pin 238 out of engagement with the hole 248 in the lock plate 250 to free the housing member 150.

It is understood as mentioned herebefore that a similar lock assembly 230 is provided at the forward end of the slide mechanism for locking of the housing member at the opposite limit of travel of the slide assembly prior to the return stroke.

The under-side of the lock plate 250, which moves with the housing member 150, is likewise shaped to provide forward and return cam surfaces 264-266, respectively, for depression of the lock pin 238 upon reciprocation of the housing member to permit the lock pin to snap into locking engagement within the hole 248.

It should be noted that the positive lock assembly 230 for the housing member 150 replaces the cam guide 70 in the schematic embodiments of FIGS. 1 to 6, which as described in detail in connection therewith, permitted the housing member 44 to be intermittently locked and unlocked, however, a more positive locking means, such as described above, will normally be preferred.

In operation, the slide assembly 136 functions in the following manner: After starting of the press or machine with which the present transfer mechanism is associated, the cylinder 170 or any other power source, which is preferably synchronized with the ram or die movement of the press, is actuated to swing the actuating lever 164 around its pivot 166, thereby moving the cam plate slide 142 by means of the rack and gear connection longitudinally through the housing member 150, which, as stated before, in the starting position of the transfer mechanism is locked against movement by the lock assembly 230. Movement of the cam plate slide 142 through the housing member 150 forces both lower and upper cam follower rollers 188-190 along their respective oblique tracks 182-184 from the initial position "A" towards the other end of the track at "B". This movement causes simultaneous inward movement of the longitudinal actuator members 202-204. Inward movement of the upper actuator member 202 causes the upper extension rods 206-207 to be moved outwardly of the housing member 150, as indicated in FIG. 14, and simultaneous inward movement of the lower actuator member 204 causes the lower extension rods 212-214 to be retracted into the housing member 150, as likewise indicated in FIG. 14. By this opposite movement of the extension rods 206-207 and 212-214, the gripping tools 210-218 are advanced towards each other to grip and retain the workpiece 68.

At the time of engagement of the gripping tools with the workpiece, the cam plate slide 142 has advanced so far through the housing member as to assume the position indicated by the broken lines in FIG. 13, and the cam shoes 252-254 have disengaged the lock pin 238 from the housing lock plate 250 to free the housing member 150. As the rear bumpers 178-180 of the cam plate slide come in abutment against the rear of the housing member 150, continuous actuating movement by the actuator lever 164 causes the complete slide assembly to move as a unit thereby transferring the workpiece longitudinally from a first station to a second station until the front bearing members 224 of the housing member 150 come to a stop against the front bumpers 226 on the slide bars 220-222. The housing member and the forwardly extended cam slide assembly will then have moved to the position indicated in broken lines in FIG. 13, which indicates the transfer distance corresponding to the distance "D" between the front bumpers 226 and the front bearing members 224 of the housing member 150. In that position, the housing member 150 will again be locked against movement by a front lock assembly (not shown) which is identical to the rear lock assembly 230.

The movement of the actuator lever 164 is then reversed, preferably in synchronism with the operation of the press or machine, to initiate the return stroke, that is, the lever is actuated on to move from "B" to "A". By this action, the cam plate slide 142 is moved the other way back through the housing member 150, which temporarily is locked against movement and thereby forcing the upper and lower extension rods 206-207 and 212-214 in opposite reverse direction by movement of the cam follower rollers 188-190 from "B" to "A" to thereby retract the gripping tools 210-218 to release the workpiece 68. Thereafter, the front lock (not shown) of the housing member 150 is released and by abutment of the front bumpers 172-174 against the front of the housing member 150 both, the cam slide and the housing member, are moved as a unit in reverse direction to again resume the start position shown in FIGS. 12 and 13. Near the end of the return stroke, the rear cam surface of the lock plate 250 overrides the lock pin 238 to permit the lock pin to snap into locking engagement in hole 248 to again lock the housing member against movement and the housing comes to a stop against the rear bumpers 228.

This cycle is continuously repeated for the duration of the press or machine operation.

A particular problem inherent in transfer devices of this kind is the requirement to perform multiple motions in different directions within the range of one power stroke which should preferably be as short as possible to reduce the overall size and the necessary power requirement. Transfer devices of this type, as already described in the foregoing, comprise a power actuated main slide which carries independently operable slave mechanisms to perform motions in a direction different than the direction of motion of the slide. In order to perform satisfactorily, proper designed positive lock and release mechanisms must be utilized between the main slide and the slave mechanisms to carry out these movements at certain intervals during each cycle. They must operate smoothly without jerking and preferably without causing a dwell in the motion.

With reference to FIGS. 17 to 19 in the drawings, two preferred embodiments of positive lock mechanisms to accomplish the foregoing purpose will be described. The embodiment illustrated in FIGS. 17 and 18 shows a preferred locking arrangement illustrated as embodied in a slide assembly similar in design to the schematic slide assembly shown in FIG. 1. A cam slide is indicated at 268 having two parallel cam tracks 270-272 with cams 274-276 disposed therein for sliding movement therealong. The cam slide 268 is supported on opposite rods 278-280 which are slidably supported within a housing member indicated at 282. The housing member is slidably supported on stationary slide bars 284-286, which are secured in a suitable manner to the base 288 of the slide assembly.

The cams 274-276 of the cam slide 268 are in the usual manner attached to parallel extension rods 290-292, which are slidably supported within the housing member 282.

A pair of lock pins 294-296 are attached to both ends of the housing member 282 to one side thereof, which are adapted to engage with oppositely disposed locking assemblies 298-300 in either forward or rear position of the housing member 282 to lock the latter intermittently against movement as previously described.

The locking assemblies 298-300 are identical and thus it will suffice to describe only one of them, which description will apply similarly to the other one. The locking assembly 300 is comprised of a support 302 which is attached to the base 288. A lever catch 304 is pivotally supported on the support 302 by means of a pivot pin 306, and is normally urged upwardly by a spring 308 supported within the support and acting on the other side of the lever catch 304, which is also designed such that gravity of the lever will lock it in place in case the spring fails. The forward end of the lever catch 304 is provided with a notch 310 adapted to receive the locking pin 296 to thus retain the housing member 282 against movement as seen in FIG. 18.

Both ends of the cam slide 268 at the slide where the lock assemblies 298–300 are located are provided with identical but reversely positioned cam members 312–314, respectively, which each has a tapered cam surface 316–318 facing in opposite directions and which are adapted to cam with a complementary cam surface 320 provided on the lever catch 304.

In operation, to unlock the lock assemblies 298–300, the cam slide 268 is moved through the housing member 282 which is locked against movement by the engagement of the rear locking pin 296 within the notch 310 of the lever catch 304 of the rear lock assembly 300 as shown. Near the end of the cam slide movement through the housing member 282, the under-side 322 of the rear cam member 314 comes to abut upon the back of the lever catch 304 and, simultaneously, the cam surface 316 of the forward cam member 312 engages the lever cam surface 320 of the forward lock assembly 298 so that upon continuing movement of the cam slide 268 the cam levers 304 will be moved out of engagement with the lock pins 294 or 296, respectively, to free the housing member 282. It will be understood that the return movement of the cam slide 168 produces a similar unlocking operation in reverse. This lock arrangement can be substituted for the lock assembly 230 in either slide assembly illustrated in FIGS. 12 and 17.

FIG. 19 shows a modified lever catch lock assembly 324 which, as will be noted, is just a reverse arrangement of the former. In this embodiment, a lock pin 326 is stationarily secured to a support bracket 328 which is attached to the base 288 of the slide assembly. A lever catch 330 is pivotally fastened at 332 to a side portion of the housing member 334 forwardly of the bracket 328 and which under-side is provided with a notch 336 for locking engagement with the lock pin 326. The lever catch 330 is normally held downwardly in locking engagement by means of gravity or by a spring 338 which one end is secured to the lever catch and the other end to the housing member 334. The front portion of the lever catch 330 is provided with a cam surface 340 adapted for camming engagement with a complementary cam surface 342 provided on a cam member 344 attached to a member 346 which is part of the cam slide (not shown). Thus, as the cam slide is being moved, the cam member 344 advances toward the catch lever 330 to permit the cam surface 342 to engage the cam surface 340 of the lever catch to cam the lever catch out of engagement with the lock pin 326 to thereby free the housing member 334. Either of these lock mechanisms shown in FIGS. 18 and 19 are equally effective.

As stated herebefore in the introductory portion of the specification, it is frequently necessary to provide the transfer device with a third motion in addition to the traverse and longitudinal motion. It occurs in instances that the load and pickup station of the workpiece is not in the same plane as the work station and the workpiece has to be lifted or lowered accordingly.

Several embodiments of such mechanisms are illustrated in FIGS. 20 to 25 and either one of which may be utilized in the transfer mechanisms shown in FIGS. 12 or 17.

The lifting mechanism shown in FIGS. 20 and 21 comprises a lower plate member 348 attached to the end of the extension rod 350, adapted for reciprocating movement towards and away from the workpiece, as described herebefore. The lower plate member is longitudinally recessed as at 349 for a purpose to appear and supports an upper plate member 352 which is vertically slidably supported thereon on vertical guide rods 354 by means of bearings or bushings 356. The guide rods 354 are secured in the lower plate member 348 and a work gripping tool 358 is attached to the upper plate member 352.

The end of the extension rod 350 extends within the bifurcated end of a first link 360 disposed in the recess 349 of the lower plate and is pivotally attached thereto by means of a pin 362, which extends outwardly on both sides through aligned slots 364–366 provided in the sidewalls of the lower plate member. The ends of the pin 362 are provided with rollers 368 within the slots 364–366 for rolling movement therein. The other end of the first link 360 extends towards the bottom of the upper plate 352 and is pivotally attached by means of a pin 370 to one end of a second link 372, which extends in opposite direction towards the front of the lower plate and into the recess 349 for pivotal securement to the lower plate by means of a pin 374. The ends of the central pin 370, which connect both links 360–372 extend outwardly and into opposite slots 376–378 provided at the bottom of the upper plate to thus connect the links to the upper plate. The ends of the pin 370 are likewise provided with rollers 380 for rolling movement within the slots 376–378.

In operation, when the extension rod 350 is advanced by means of either of the slide mechanisms shown in FIG. 12 or 17 in a manner as previously described, the lower plate 348 at a predetermined distance of rod movement abuts against a fixed stop member 382 to limit further movement of the lower plate. The extension rod, however, continues to advance inwardly of the lower plate by means of the slots 364–366 and thereby causing the links 360–372 to jack-knife upwardly, causing the upper plate 352 to be raised along the guide rods 354 to thus raise the gripping tool 358 above the normal plane of slide movement. The central slot arrangement 376–378 of the bottom of the upper plate 352 accommodates the angular movement described by the central pin 374 indicated in broken lines, whereas the vertical guide rods 354 assure a straight vertical movement of the upper plate 352. Upon return, that is, upon disengaging movement of the extension rod 350, the upper plate 352 is drawn back upon the lower plate 348 and in order to prevent any extreme shock loads to be imparted to the mechanism damper springs, rubber blocks or the like 384 are provided between the upper and lower plate, which are disposed around the guide rods 354 to dampen the downward movement of the upper plate.

FIGS. 22 and 23 illustrate a modified lifting mechanism comprised of a lower support plate 386 which is secured to an extension rod 388 actuated by a slide mechanism 390 in the manner described previously. The support plate 386 carries a member 394 which is movable relative to the plate 386 by means of rollers 396 rotatably supported on pins 397 and 398 of which the pin 398 is slidable in a slot 392. A pair of diagonal links 400–402 are pivotally secured in diagonal opposite position to a top plate 404 by means of pivot pins 406 and 407 of which the latter one is likewise slidable in a slot 393. The top plate 404 normally rests on a central support member 408 which extends between the member 394 and the top plate. A work gripping tool 410 is secured to the top plate 404 which is adapted to be raised a predetermined distance relative to the support 408 by means of the diagonal link arrangement. To this end, the pair of links 400–402 are pivotally connected to each other intermediate their ends by means of a central pin 412 which is vertically slidable within a slot 414 and the upper portion of the central support 408. Thus, a scissor type lifting arrangement has been provided which functions in the following manner: As the extension rod 388 is moved outwardly of the slide mechanism 390 by the means previously described, the member 394 at a predetermined distance of the rod movement comes in abutment against a fixed stop, indicated at 416, whereafter upon continuing movement of the extension rod 388 the member 394 will advance the pin 398 in the slot 392, thereby pivoting both pairs of links 400–402 upwardly to thus raise the top plate 404 and with it the work gripping tool 410. The central pivot pin 412 acts as a guide to assure straight vertical movement of the top plate 404 by means of its sliding engagement within the slot 414.

As additionally indicated in FIG. 22, an alternate stop arrangement can be provided by means of a rod 418 attached to the member 394 and extending towards the slide structure for extension through a bearing support 420 which is secured to a part of the framework of the slide mechanism 390. The end of the rod 418 at the other side of the bearing support is provided with an adjustable stop member 422 which may be in the form of nuts or the like. Thus, considering the top plate 404 in its raised position, as indicated in dot and dash lines in FIG. 22, as the extension rod 388 advances outwardly, the stop member at a certain distance of rod movement comes in abutment against the bearing support 420 thereby restricting further movement of the member 394, which causes the pair of links 400–402 to be pivoted upwardly by means of movement of the pins 398 and 407 in their respective slots 392 and 393.

With reference now to FIGS. 24 and 25, there is illustrated still another modification of a lift mechanism, shown in cross section, and which is comprised of a bottom plate 424 attached to the end of an extension rod 426 supported for reciprocation in a slide housing, part of which is indicated at 427, as described herebefore. The bottom plate 424 supports a housing 428 and has a central boss portion 430 into which is secured a guide pin 432 on which is slidably supported a top plate member 434 by means of a bearing 435 and bushing 436. The top plate 434 is vertically movably connected to the bottom plate 428 by means of a pair of opposite parallel links 440 which at the lower end are pivotally and slidably connected to the bottom plate 428 to the rear of the guide pin 432 by means of a pivot pin 442 and are connected at the upper end to the front end of the top plate 434 diagonally across therefrom by a pivot pin 444. A rod 448 is pivotally attached to the top plate 434 underneath thereof by a pivot pin 446 and the other end of the rod 448 is retained within a bearing 449 contained in a spherical bearing support 450, which is fixed to a stationary part of the slide mechanism (not shown). Normally, the end of the rod 448 extends outwardly of the spherical bearing support 450 and is provided with an adjustable stop member 452 so that, in operation, when the extension rod 426 is being advanced outwardly of the slide housing 427, the adjustable stop member 452 at the end of the rod 448 comes into contact with the bearing 449 of the fixed spherical bearing support 450 by which further linear movement of the rod 448 and thus of the top plate 434 is prevented. However, continuing movement of the extension rod 426 causes the rod 448 to be angularly pivoted within the spherical bearing support 450 whereby the top plate 434 is caused to move vertically upwardly along the guide pin 452 and thus raise the gripping tool 458. Return movement of the extension rod 426 causes the rod 448 to pivot angularly downwardly to lower the top plate 434 into its initial starting position.

As additionally indicated in FIGS. 24 and 25, the extension rod is provided with a safety feature assuring the retraction of the work gripping tool 458 at the end of the extension rod 426 from the work area so as not to be damaged by the die punch or ram of the machine with which the transfer mechanism is associated.

The safety feature comprises a two-part extension rod 426 connected together by a shear pin 454. Normally, upon malfunction of the slide mechanism due to an overload or the like, the shear pin 454 would break and thus sever the connection between the extension rod 426 and the slide mechanism 427. This condition would normally leave the work gripping tool within the work area of the machine to be consequently damaged by the receding die punch or ram. To prevent this from happening, the provided safety feature consists of a cross bar 456 attached to the outer end portion of the extension rod 426, which is adapted to cooperate with a cam 458 acting thereon in synchronism with the operation of the press to thereby positively return the extension rod and thus the work gripping tool 438 regardless of the condition of the shear pin 454.

Normally, all embodiments of the lift mechanism shown in FIGS. 20 to 25 are grouped in pairs arranged side by side which are tied together by a tie bar or cross bar such as 456 in FIGS. 24 and 25.

The present invention may be embodied in certain other forms without departing from the spirit and characteristics thereof, therefore, the present embodiments are to be considered in all respects as illustrative only and not restrictive the scope of the invention being indicated by the appended claims rather than by the foregoing description.

I claim:

1. In a transfer device for simultaneously advancing workpieces from one station to a next adjacent station, a base, a slide on said base, a drive means for reciprocally moving said slide on the base along the stations, a carrier on said slide for movement normal to the slide movement, means associated with said slide to maintain said slide stationary at predetermined stages of reciprocal movement of said drive means, cam means carried by said slide, means interconnecting said drive means and carrier and coacting with said cam means in such a manner to move said carrier while said slide is retained stationary, workpiece engaging fingers on said carrier aligned with said stations and movable into engagement with said workpieces, and means for raising said fingers after their engagement with said workpieces.

2. In a transfer device as recited in claim 1, wherein after the fingers are raised the slide is released and advanced by said drive means to move the fingers to the next adjacent station.

3. A transfer mechanism for moving a work piece through a plurality of work stations along a continuous path formed of a plurality of diverging sections, comprising:
 a support;
 opposed slide members disposed on said support for conjoined reciprocatory movement;
 opposed work gripping means movably supported on each said slide members for movement in a direction transverse to the movement of said slide members between an advanced and a retracted position;
 first guide means associated with each said slide members operably connected to said work gripping means;
 second guide means associated with each said work gripping means to control movement of said first guide means;
 said first guide means comprising:
  at least one track having a follower disposed therein adapted to be moved alternately between a first and a second position upon reciprocation of said slide members; and
 said second guide means comprising:
  a circumferential track having a follower disposed therein adapted to be moved intermittently and continuously along a circumferential path corresponding to said first path formed of a plurality of diverging sections upon conjoined movement of said slide members and said work gripping means.

4. The transfer mechanism as defined in claim 3, in which said opposed slide members each comprise a housing, a cam member disposed in said housing containing said track, said cam member being longitudinally movable relative to said housing, a first pair of spaced opposite stationary stop means associated with said transfer mechanism to arrest longitudinal movement of said housing, a second pair of spaced opposite stationary stop means associated with said transfer mechanism to arrest longitudinal movement of said cam member; said second guide means being effective to arrest movement of said housing in a first stage of operation and thereby causing transverse movement of said work gripping means when said cam member is moved through said housing.

5. The transfer mechanism as defined in claim 4, in which said cam member is provided with abutting means adapted to abut against said housing upon completion of said first stage of operation to cause movement of said work gripping means to stop and initiate conjoint movement with said housing in a second stage of operation.

6. The transfer mechanism as defined in claim 5, in which said first and said second pair of stop means are effective to simultaneously stop movement of said housing and said cam member at the completion of said second stage of operation and thereby initiating reverse movement of said transfer mechanism.

7. The transfer mechanism as defined in claim 3, in which said first and said second guide means cooperate to successively advance said opposed work gripping means towards each other to grip and retain a workpiece between them, transfer said workpiece in a direction parallel to the reciprocating movement of said slide member and release said workpiece by movement away from each other, said first and said second guide means being constructed such as to prevent the introduction of shocks upon changing of directions of said movements.

8. The transfer mechanism as defined in claim 3, in which said second guide means comprising a circumferential track is provided with arresting means to prevent back tracking of said follower within said track.

9. The transfer mechanism as defined in claim 3, in which said first guide means comprises an oblique curvilinear track defining a sloping track portion culminating into a relatively large radii portion at the end of the track defining the point in the follower travel at which the work gripping means engage the work substantially without shock.

10. A transfer mechanism for gripping a work piece and moving said workpiece along a path of alternately changing directions within intersecting planes comprising:
   a base;
   a bed secured to said base;
   at least one slide assembly supported on said bed for reciprocatory movement therealong;
   said slide assembly comprising:
      a first member;
      a second member operably connected to said first member for movement relative thereto;
   a work handling assembly movably associated with said slide assembly for independent movement in a first direction substantially perpendicular to the movement of said slide assembly;
   said work handling assembly comprising:
      support means associated with said second member of said slide assembly and operably connected thereto for movement relative thereto;
   means comprising at least one cam slot having a cam roller disposed therein providing an operable connection between said first member of said slide assembly and said support means of said work handling assembly to effect movement of said work handling assembly in said first direction substantially perpendicular to the direction of movement of said slide assembly upon actuation of the latter;
   means associated with said slide assembly, operable in a first position to prevent movement of said second member in a first stage of operation of said slide assembly to thereby effect movement of said support means of said work handling assembly in said first direction perpendicular to the movement of said slide assembly, operable in a second position to permit movement of said second member together with said first member in a second stage of operation of said slide assembly to thereby effect movement of said work handling assembly in a second direction parallel to said slide assembly, means operable in a third position to permit movement of said support means in a second stage of operation of said slide assembly to thereby effect movement of said work handling assembly in a third direction normal to said first and said second direction; and
   reversible drive means operable to reciprocate said slide assembly.

11. The transfer mechanism as defined in claim 10, in which said first member of said slide assembly comprises a housing supported on a longitudinal track for sliding movement therealong, said second member comprising a cam slide reciprocably supported within said housing for movement in a direction parallel with said housing, said cam slide comprising said means having at least one cam slot and a cam roller disposed therein, said support means operably connected to said cam rollers for sliding movement relative to said housing and said cam slide in a direction normal to the direction of movement of said slide assembly, said means associated with said slide assembly being effective in a first stage of operation to restrict movement of said housing upon actuation of said slide assembly so that said cam slide moves through said housing to cause said cam rollers to move within said cam slot to thus advance said support means out of said housing for engagement of said work handling assembly with said workpiece, said means being effective in a second stage of operation to cause conjoint movement of said cam slide, said housing and said support means in longitudinal direction of said slide assembly to thus transfer said workpiece engaged by said work handling assembly from a first station to a second station.

12. The transfer mechanism as defined in claim 11, said cam slot comprising an oblique curvilinear track comprised of a sloping portion culminating into a portion of relatively large radii which defines the point in the cam roller travel at which the work handling means engage said work, said radii in said track providing a substantially shockless engagement with said work.

13. The transfer mechanism as defined in claim 11, said support of said work handling means comprising at least one extension member slidably supported within said housing and operably connected to said cam roller, said extension member provided outside of said housing with work gripping means comprising jaws.

14. The transfer mechanism as defined in claim 13, further providing means between said extension member and said work gripping means effective upon movement of said extension member out of said housing to raise said jaws in a direction vertical to the direction of movement of said extension member, and to lower said jaws upon movement of extension member back into said housing.

15. The transfer mechanism as defined in claim 14, said means to raise said jaws comprising a lower support secured to said extension member, an upper support spaced from said lower support carrying said jaws and means vertically movably connecting said upper support to said lower support responsive to reciprocatory movement of said extension member to raise or lower said upper support.

16. The transfer mechanism as defined in claim 15, in which said connecting means comprises a collapsible linkage pivotally connected between said lower support and said upper support, and means associated with said slide assembly to cause pivoting movement of said linkage to thus raise or lower said upper support in relation to said lower support.

17. The transfer mechanism as defined in claim 15, further providing guide means between said lower support and said upper support to maintain vertical movement of said upper support relative to said lower support.

18. The transfer mechanism as defined in claim 13, providing a pair of spaced extension members, one of said extension members connected to a cross bar, said extension members provided with an overload release means adapted to sever connection between said extension members upon occurrence of an overload, and reciprocating means operable in synchronism with said drive means to act on said cross bar to positively return its associated extension member upon severance of connection between said extension members.

19. The transfer mechanism as defined in claim 11, in which said cam slide is provided with a pair of oppositely directly diagonally disposed cam slots, a cam roller disposed in each of said cam slots, first work handling means including said support means operably connected to a cam roller in the first of said pair of cam slots, second work handling means including said support means operably connected to a cam roller in the second of said pair of cam slots, said pair of diagonally disposed cam slots being effective upon reciprocation of said cam slide within said housing to move said first work handling means in a direction outwardly of said housing and said second work handling means in opposite direction inwardly of said housing.

20. The transfer mechanism as defined in claim 19, said first and said second work handling means being provided at their ends outwardly of said housing with work gripping means facing each other and disposed in a common plane so that upon movement of said first work handling means outwardly of said housing and said second work handling means inwardly of said housing said work gripping means advance towards each other to grip a workpiece between them.

21. The transfer mechanism as defined in claim 11, said means associated with said slide assembly to prevent movement of said housing comprising a first locking member attached to said housing adapted to be normally engaged by a second locking member stationarily secured to said slide assembly, said second locking member being spring loaded into engagement with said first locking member.

22. The transfer mechanism as defined in claim 11, said means associated with said slide assembly to prevent movement of said housing comprising a lock assembly including a lock pin normally spring loaded into engagement with a catch member secured to said housing, cam means associated with said cam slide adapted upon movement of said cam slide to force said lock pin out of engagement with said catch member at a predetermined distance of movement of said cam slide.

23. The transfer mechanism as defined in claim 21, said lock assembly comprising a locking pin secured to said housing, a stationary lever catch supported for pivoting movement having a slot adapted to be engaged by said pin to lock said housing against movement, said lever catch normally bring spring loaded into engagement with said pin, cam means associated with said cam slide, and said lever catch having a cam surface engagable by said cam means at a predetermined distance of movement of said cam slide to engage said cam surface of said lever catch to move said lever catch out of engagement with said locking pin.

24. The transfer mechanism as defined in claim 23 said lever catch being constructed to provide a weighted portion adapted to urge said lever around said pivot into engagement with said locking pin independently of said spring loaded means.

25. The transfer mechanism as defined in claim 11, drive means of said slide assembly comprising a rod secured to said cam slide, said rod having a cam follower roller secured to its other end adapted to be in engagement within a slot provided in one arm of a bellcrank lever spring pivotally connected to a link which other end is pivotally connected to a reciprocating member, said bell crank lever being stationarily pivotally secured between said arms so that upon reciprocation of said member said bell crank lever will be rotated to advance or retract said rod by means of the connection of said cam roller with said slot of said bell crank lever.

26. A transfer mechanism as defined in claim 11, in which said drive means of said slide assembly comprises a first rack supported on a stationary part of said slide assembly, a second rack supported on a movable part of said slide assembly, gear means rotatably supported between said first rack and said second rack and in meshing engagement with both of them, and means to rotate said gear means so that upon rotation of said gear means said second rack associated with said slide assembly will be moved longitudinally parallel to said first rack to thus reciprocate said slide assembly.

27. The transfer mechanism as defined in claim 26, said gear means comprising a pair of floating gears disposed between said first and said second rack, said pair of gears being floating gears disposed between said first and said second rack, said pair of gears being floatingly supported at the end of an actuator lever for movement of said pair of gears longitudinally between said racks to thus cause rotation of said pair of gears by which said second rack associated with said slide assembly will be forced to move longitudinally parallel to said first rack.

28. The transfer mechanism as defined in claim 27 in which said actuator lever comprises a pendulum fixedly pivotally supported at its end opposite from said gears and drive means positioned intermediate the ends of said actuator lever to oscillate said lever around said pivot support.

29. The transfer mechanism as defined in claim 28 in which said drive means comprises a fluid cylinder moving a push rod connected to said actuator lever intermediate its ends.

30. The transfer mechanism as defined in claim 28 in which said drive means comprises a reciprocating cam acting on said actuator lever.

31. The transfer mechanism as defined in claim 27 in which said pair of gears are floatingly supported on an enlarged head portion of said actuator lever within spaced slots to permit said gears to adjust themselves upon oscillating movement of said actuator lever to maintain parallel longitudinal movement between said racks.

32. Transfer mechanism for moving a tool member along a multi-directional path from a first station to an advance station and back to said first station, comprising:
a slide assembly reciprocable between said stations, composed of an actuator member slidably disposed within a support member which is relatively movable thereto at preselected points of reciprocating movement of said slide assembly,
a tool member slidingly connected to said support for successive multi-directional movement relative to said slide assembly at preselected positions of reciprocating movement of said slide assembly,
actuating cam means associated with said actuator member and operably connected to said tool member,
means associated with said support to arrest movement of said support at predetermined stages of reciprocating movement of said slide assembly,
said actuating cam means and said arresting means cooperating such that upon reciprocating movement of said slide assembly said tool member will be moved in a first direction different from the direction of movement of said slide assembly during a portion of said movement and in a direction different from said first direction during another portion of said slide assembly movement.

33. In a transfer device for simultaneously advancing workpieces from one station to a next adjacent station, a base, a slide on said base, a drive device for moving said slide and advancing it on the base along the stations, carriers on said base movable by said slide toward and away from said stations, means connecting said slide to said carriers for moving said carriers toward and away from each other while said slide is retained stationary, workpiece engaging fingers on said carriers alignable with said stations and movable into engagement with said workpieces, means on said carriers for raising and lowering said fingers, said transfer device being mounted in a press having a ram, means actuated by said ram in its upward and downward movements for operating said drive means, the upward movement of the ram first moves the fingers into workpiece engaged position after which the fingers are raised and the slide is released to permit it to be advanced by the drive means to advance the fingers to the next adjacent station in alignment therewith, and means for locking the slide in advance position.

34. In a transfer device as recited in claim 33, wherein the subsequent downward movement of the ram lowers the fingers and retracts the fingers from the station as the slide is released and the drive means retracts the slide to have the fingers aligned with their initial station as the die operation is performed on the advanced workpiece, and means for locking the slide in its retracted position.

35. In a transfer device as recited in claim 34, wherein a plurality of pairs of fingers are mounted on the carriers to move simultaneously toward the stations until the workpieces are engaged after which the fingers are held against advancement as the carriers continue to move toward the stations, and means actuated by the further movement of the carriers for raising the fingers and workpieces from the dies at the station.

36. In a transfer device as recited in claim 34, wherein the weight of the fingers and workpieces causes the fingers to first lower when the carrier is initially retracted upon the downward movement of the ram to lower the workpieces onto the dies at the stations before the remaining movement of the carrier retracts the fingers and the fingers and carriers are returned to their initial positions as the die operations are performed.

* * * * *

UNITED STATES PATENT OFFICE
CERTIFICATE OF CORRECTION

Patent No. __3,655,070__     Dated __April 11, 1972__

Inventor(s) __Bartley A. Haydu__          (HBA-100-A)

It is certified that error appears in the above-identified patent and that said Letters Patent are hereby corrected as shown below:

IN THE SPECIFICATION:

Col. 5, line 1, change "racks" to --tracks--;

Col. 7, line 73, delete the first "A"

line 74, delete the second "A"

Col. 13, line 7, before "where" change "slide" to --side--

Signed and sealed this 1st day of August 1972.

(SEAL)
Attest:

EDWARD M. FLETCHER, JR.    ROBERT GOTTSCHALK
Attesting Officer           Commissioner of Patents